United States Patent [19]

Williams

[11] 3,923,828

[45] Dec. 2, 1975

[54] PROCESS FOR SEPARATING N-METHYL-NITROPHTHALIMIDES

[75] Inventor: Frank J. Williams, Scotia, N.Y.

[73] Assignee: General Electric Company, Schenectady, N.Y.

[22] Filed: May 8, 1974

[21] Appl. No.: 468,000

[52] U.S. Cl. .............................. 260/326 N; 260/520
[51] Int. Cl.² ........................................ C07D 209/40
[58] Field of Search ................................. 260/326 N

[56] References Cited
OTHER PUBLICATIONS

Tech. of Chem. Vol. 2 (1973) pp. 770–771.
Academie des Sciences Vol. 242 (1956) pp. 916–918.
Chem. Abst. Vol. 77 (1972) 19327y, 19330u, 19331v.
Org. Syntheses Collective Vol. I (1941) pp. 408–409.

*Primary Examiner*—Lewis Gotts
*Assistant Examiner*—D. R. Phillips
*Attorney, Agent, or Firm*—Joseph T. Cohen; Jerome C. Squillaro

[57] ABSTRACT

N-methyl-4-nitrophthalimide can be separated from a mixture of the latter with N-methyl-3-nitrophthalimide by contacting the mixture of nitrophthalimides with a lower alkanol of from 1 to 2 carbon atoms and thereafter isolating the N-methyl-4-nitrophthalimide from the alkanol solution containing the N-methyl-3-nitrophthalimide.

7 Claims, No Drawings

PROCESS FOR SEPARATING N-METHYL-NITROPHTHALIMIDES

This invention is concerned with a process for isolating N-methyl-4-nitrophthalimide from a mixture of the latter with N-methyl-3-nitrophthalimide. More particularly, the invention is concerned with a process for removing N-methyl-4-nitrophthalimide from a mixture of the latter with N-methyl-3-nitrophthalimide which comprises treating the aforesaid mixture with a lower alkanol of from 1 to 2 carbon atoms and thereafter separating the alkanol solution formed thereby containing the N-methyl-3-nitrophthalimide so as to isolate essentially pure N-methyl-4-nitrophthalimide.

N-methyl-3-nitrophthalimide and N-methyl-4-nitrophthalimide are employed in the preparation of polymers having good heat resistance. More particularly, these nitrophthalimides are first reacted with the dialkalimetal salt of bisphenol-A [(2,2-bis-4-hydroxyphenyl)propane] to form a derivative having the formula

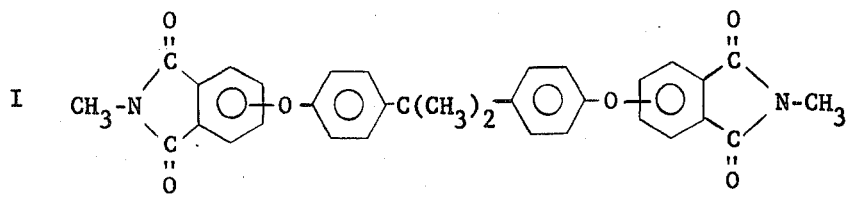

Thereafter the bisimide of formula I can be treated with aqueous sodium hydroxide and water to form the corresponding tetracarboxylic acid having the formula

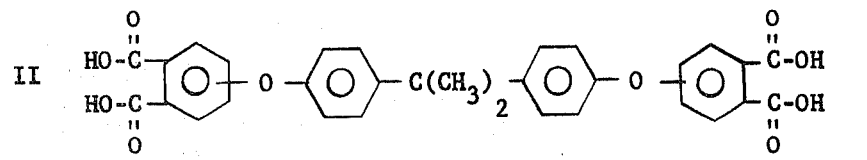

By suitable treatment of the tetraacid of formula II with, for instance, glacial acetic acid and acetic anhydride, one can obtain the corresponding dianhydride, for instance, 2,2-bis[4-(3,4-dicarboxyphenoxy)-phenyl]propane dianhydride. These dianhydrides can then be reacted with organic diamines such as 4,4'-diaminodiphenylmethane, m-phenylene diamine, 4,4'-diaminodiphenyloxide, etc., to give polymers having good high-temperature properties. Polyetherimide polymers derived in the above manner are more particularly disclosed and claimed in the copending application of Darrell R. Heath and Joseph G. Wirth in Ser. No. 319,327, filed Dec. 29, 1972, which in turn is a continuation-in-part of application Ser. No. 108,151 of the same applicants filed Jan. 20, 1971, now U.S. pat. No. 3,787,475, issued Jan. 22, 1974, both applications being assigned to the same assignee as the present invention. The polyetherimides obtained in the manner described above can be used in various molding applications, for instance, as housings for appliances and for motors, as brake linings where heat resistance and other improved physical properties are essential, etc.

In the copending application of Newell C. Cook and Gary C. Davis, Ser. No. 468,012, filed May 8, 1974 and assigned to the same assignee as the present invention, is disclosed and claimed a process for nitrating N-methylphthalimide whereby there is obtained a mixture of nitrated products composed essentially of the N-methyl-3-nitrophthalimide (hereinafter identified as "3-isomer") and N-methyl-4-nitrophthalimide (hereinafter identified as "4-isomer"). According to this process, N-methylphthalimide, dissolved in concentrated sulfuric acid, is treated with concentrated nitric acid to form a mixture of the aforesaid two isomers. Thereafter, the mixture of the two isomers can be extracted from the reaction mixture by treating the acid solution of the isomers with methylene chloride and thereafter removing the methylene chloride, for instance, by heat. Generally the mixture of the two isomers comprises up to 8% of the 3-isomer, the balance being the 4-isomer with a small percentage, generally less than 1%, of unreacted N-methylphthalimide. Although this mixture can often be employed without further processing for making polyetherimides in the manner described previously, in some applications it is desirable to obtain the 4-isomer in essentially pure form free of the 3-isomer and free of the N-methylphthalimide, in order to obtain polymers which have been found to have better properties than those wherein the polymers are made from the mixture of the 3-isomer and the 4-isomer.

Normally, if essentially pure 4-isomer is desired, highly sophisticated and expensive fractional distillation equipment or complex crystallization techniques are required. Even then, there are often undesirable traces of the 3-isomer present in the isolated form of the 4-isomer.

I have unexpectedly discovered that I can separate a mixture of the 4-isomer and the 3-isomer into its components readily and inexpensively by treating the mixture with a lower alkanol of from 1 to 2 carbon atoms (e.g., methanol and ethanol), and removing the alkanol solution thereby freeing the 4-isomer of essentially all the 3-isomer and any unreacted N-methylphthalimide. Although a small amount of the 4-isomer is present with the 3-isomer, the amount of the 4-isomer is so small that the achievement of obtaining pure 4-isomer warrants whatever loss of the 4-isomer that may be entailed.

In carrying out my reaction, the mixture of the 4-nitro and 3-nitro isomers is mixed with the lower alkanol in a weight ratio advantageously, although not essentially, limited to about 0.5 to 10 parts or more of the alkanol per part of the mixture of the isomers. Thereafter the mixture of the two isomers with the alkanol can be stirred either at ambient temperature (or lower temperatures if desired) or can be heated at elevated temperatures on the order of about 50°C. to as much as the boiling point (reflux temperature) or more of the alkanol mixture for a time ranging from about 10 minutes to one or more hours to insure that all the 3-isomer is dissolved in the alkanol. The temperature is not critical and can be varied widely. Thereafter, upon cooling the mixture, the 4-isomer will separate out as a crystalline precipitate which can be readily filtered and dried in vacuum to give almost pure 4-isomer. The alkanol solution which is rich in the 3-isomer will contain a small percentage of N-methyl-4-nitrophthalimide and any N-methylphthalimide which might have been present in the mixture.

In order that those skilled in the art may better understand how the present invention may be practiced, the following examples are given by way of illustration and not by way of limitation.

In carrying out these examples, two principal sources of the mixtures of the N-methyl-3-nitrophthalimide and N-methyl-4-nitrophthalimide were employed. Material I was obtained from a large scale nitration done similarly as described in the aforementioned Cook and Davis patent application (which by reference is made part of the disclosures of the instant application) in which the reaction mixture was worked up by pouring it into water and filtering the resultant precipitate. The precipitate was washed with water to remove residual acid to give a mixture of the 3-isomer and 4-isomer. Material II was obtained by a nitration process, again, carried out in accordance with the aforesaid process of Cook and Davis, wherein the product of reaction was subjected to continuous extraction with methylene chloride to obtain the mixture of the 4- and 3-isomers, and thereafter the methylene chloride was removed by distillation to yield the mixture of isomers.

EXAMPLE 1

A mixture of 100 ml. methanol and 25 grams of Material II having a melting point of about 155°–165°C. was heated at the reflux temperature of the mass for about 15 minutes. The mixture was then cooled to room temperature and the resultant precipitate was removed by filtration to give a powder which after drying yielded 20.58 grams of N-methyl-4-nitrophthalimide having a melting point of 175°–177°C. Analysis by $^{13}$C and vapor phase chromatography indicated that only the 4-isomer was present in this material and that it was substantially completely free of the 3-isomer.

EXAMPLE 2

Example 1 was repeated in its essentials with the exception that Material I was substituted for Material II; results were substantially the same as in Example 1.

EXAMPLE 3

In this example, a mixture of 25 grams of Material I and 75 ml. methanol was stirred vigorously at room temperature (about 25°–27°C.) for about 30 minutes. The precipitate which was obtained was removed by filtration and the powder was dried to give 23.2 grams of N-methyl-4-nitrophthalimide having a melting point of 174°–176°C. Analysis by $^{13}$C and vapor phase chromatography again indicated the presence of only the N-methyl-4-nitrophthalimide essentially free of the 3-isomer. The methanol solution composed essentially of all the 3-isomer contained only a few percent (about 2 to 4%) of the 4-isomer.

EXAMPLE 4

Example 3 was repeated in its essentials with the exception that Material I was replaced by Material II. The results were substantially the same as in Example 3.

The following Table I is a summary comparison of the constituents present in the starting material and in the purified materials resulting from the use of the methanol to separate the 4-isomer from the 3-isomer. It will be noted from this table that the purity of the isolated N-methyl-4-nitrophthalimide is almost the same at room temperature as though the process was carried out with a reflux step. It will also be noted that the amount of the 3-isomer present in the isolated 4-isomer is essentially zero. Finally, it will be noted that the percent recovery of the 4-isomer is high whether the alkanol was used with a reflux step or was used at room temperature.

TABLE I

| | Material I | Material II |
|---|---|---|
| m.p. crude mixture °C. | 165–172 | 155–165 |
| m.p. 4-isomer from Examples 1 and 2 - °C. | 175–177 | 175–177 |
| m.p. 4-isomer from Examples 3 and 4 -°C. | 174–176 | 174–175 |
| % 3-isomer in crude (by $^{13}$C) | 6 | 8 |
| % 3-isomer in crude (by vpc) | 4.6 | 5.6 |
| $^a$% 3-isomer after CH$_3$OH reflux | 0 | 0 |
| $^a$% 3-isomer after room temp. treatment with CH$_3$OH | 0 | 0 |
| % recovery 4-isomer from CH$_3$OH reflux (Examples 1 and 2) | 92% | 85% |
| % recovery 4-isomer after room temp. treatment with CH$_3$OH (Examples 3 and 4) | 92% | 82% |

$^a$By both $^{13}$C and vpc tested on isolated 4-isomer in all four examples.

EXAMPLE 5

A mixture of 25 grams of Material I and 100 ml. ethanol was stirred at room temperature for about 30 minutes after which time a precipitate was obtained which was removed by filtration. This powder was dried and analyzed by vapor phase chromatography. This test was repeated but instead, the mixture of Material I and the ethanol was heated at the reflux temperature of the mass for about 15 minutes, cooled to room temperature, and the resultant precipitate removed filtration. Again, the product was dried and analyzed by vapor phase chromatography. Finally, another test was carried out in which 200 ml. ethanol was used with 25 grams of Material I and heated at the reflux temperature of the mass; the mixture was allowed to cool and the precipitate was isolated by filtration, dried and analyzed by vapor phase chromatography. The following Table II shows the results of these tests, including the temperature conditions at which the tests were carried out, the percentage of the N-methyl-3-nitrophthalimide found in the ethanol filtrate, the percent yield of the 4-isomer, and the melting point of the N-methyl-4-nitrophthalimide.

TABLE II

| *Ethanol Material I Ratio | Temperature of Reaction | Percent 3-isomer | Percent Yield 4-isomer | Melting Point °C. |
|---|---|---|---|---|
| 4:1 | Room Temp. | 2–3 | 94 | 170–173 |
| 4:1 | Reflux | 2–3 | 93 | 168–173 |
| 8:1 | Reflux | <1 | 93 | 174–176 |

*Ratio is numerical relationship of ml. of ethanol to grams of Material I.

It will be noted that the use of the ethanol resulted in trace amounts of the 3-isomer being present in the isolated N-methyl-4-nitrophthalimide; however, when the ethanol to mixture ratio was increased, as evidenced by the use of 200 ml. ethanol (instead of 100 ml. ethanol), then the ethanol removed essentially all of the 3-isomer.

It will of course be apparent to those skilled in the art that in addition to the temperatures and conditions employed above, other temperatures and conditions which have been described previously, as well as varying concentrations of the alkanol with relation to the crude mixture of the 4-isomer and the 3-isomer can be used without departing from the scope of the invention.

What I claim as new and desire to secure by Letters Patent is:

1. In the process for isolating N-methyl-4-nitrophthalimide from a mixture of the latter and N-methyl-3-nitrophthalimide, the improvement which comprises contacting the mixture with a lower alkanol of from 1 to 2 carbon atoms, separating the alkanol solution rich in the N-methyl-3-nitrophthalimide thereby isolating the N-methyl-4-nitrophthalimide.

2. The process as in claim 1 wherein the alkanol is methanol.

3. The process as in claim 1 wherein the alkanol is ethanol.

4. The process as in claim 1 wherein the treatment with the alkanol is conducted at a temperature above ambient temperature.

5. The process as in claim 1 wherein the treatment with the alkanol is conducted at essentially ambient temperature.

6. The process for separating N-methyl-4-nitrophthalimide from a mixture of the latter with N-methyl-3-nitrophthalimide which comprises contacting the aforesaid mixture with methanol, removing the methanol solution thereby separating the N-methyl-4-nitrophthalimide in essentially pure form and retaining the N-methyl-3-nitrophthalimide dissolved in the methanol.

7. The process as in claim 6 wherein the treatment with the methanol is carried out at temperatures above ambient temperature.

* * * * *